INVENTOR.
William C. Bubniak
BY Paul Fitzpatrick
ATTORNEY

United States Patent Office 3,298,428
Patented Jan. 17, 1967

3,298,428
ROTARY REGENERATOR SEAL
William C. Bubniak, Warren, Mich., assignor to General Motors Corporation, Detroit, Mich., a corporation of Delaware
Filed Aug. 2, 1965, Ser. No. 476,425
8 Claims. (Cl. 165—9)

My invention is directed to rotary regenerators, and particularly to the diaphragm seals of such devices. A rotary regenerator is a heat exchange device in which a porous matrix is rotated slowly so that each part of the matrix passes alternately through a stream of hot gas and a stream of cool gas, absorbing heat from the hot gas and delivering it to the cool gas. The gas may flow parallel to or perpendicular to the axis of rotation. In the preferred embodiment of the invention described herein the regenerator is of the radial flow type, also called drum type.

In such regenerators, a diaphragm separates the chambers through which the two streams of fluid pass. It is necessary to minimize leakage from one chamber to the other past the bulkhead, and therefore a seal called a main or diaphragm seal is provided encircling the matrix where it passes through the diaphragm. More specifically, the main seal may include a primary seal which seals against the matrix and a secondary seal which seals between the primary seal and the diaphragm. Because of thermal expansion and possible warping of the parts the primary seal ordinarily needs to float to some extent in the housing of the regenerator.

Sealing between the main seal and the matrix is difficult because, with gas flowing from one face of the matrix to the other (whether radially or axially) there is a temperature gradient from one face to the other and the matrix distorts, the hot face becoming convex and the cooler face concave. U.S. Patent No. 2,888,248 of Bubniak et al. for Rotary Regenerator Seal, issued May 26, 1959, is directed to means for minimizing leakage by use of a seal structure which distorts with temperature in response to expansion of the hot side seal bar so as to approximate the curvature of the faces of the matrix. My present invention is directed to an improvement in such a seal, making it possible to achieve greater flexibility in selection of materials and therefore better operating characteristics of the seal and facilitating variation or reduction of the degree of curvature of the seal to adjust the seal most closely to a particular matrix structure. To indicate the nature of my invention, in its preferred embodiment it involves the provision of a rod of ceramic or other material of low thermal expansion incorporated in the hot side seal bar so as to achieve a degree of expansion which is less than that of a seal bar made entirely of metal. A seal according to my present invention is adaptable to matrices having relatively small thermal distortion because of special matrix structure minimizing such distortion.

The nature of my invention and the advantages thereof will be clear to those skilled in the art from the succeeding detailed description of the preferred embodiment of the invention and the accompanying drawings thereof.

Figure 1:
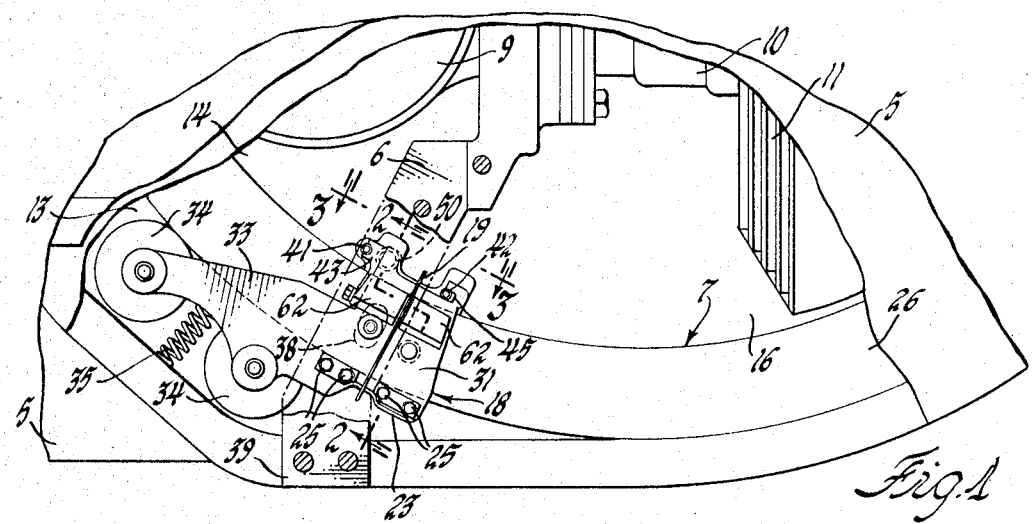
FIGURE 1 is a partial view of a regenerative gas turbine engine taken on a plane perpendicular to the axis of a drum regenerator, with parts cut away and in section.

Referring first to FIGURE 1, the invention is illustrated as incorporated in a regenerative gas turbine engine of the type shown in U.S. Patent No. 3,057,604 for Rotary Regenerator of Bubniak et al., issued October 9, 1962, modified to include a guiding roller structure for the main seal of the type shown in U.S. Patent No. 3,077,074 for Regenerative Gas Turbines of Collman et al., issued February 12, 1963. In view of the background information available in these patents, there is no need to describe the engine or the over-all regenerator to explain my present improvement in the main seal.

FIGURE 1 illustrates a portion of the engine case or housing 5, which also is the regenerator housing, a diaphragm 6, and a drum type regenerator matrix 7. It also illustrates a portion of the combustion apparatus 9 of the engine which discharges motive fluid into a turbine 10 mounted in the diaphragm 6. The turbine exhausts through a diffuser 11 into a hot gas space 16 within the matrix and to the rear of the diaphragm. The turbine drives a compressor (not shown) which delivers air to a cold air space 13 exterior to the matrix and forward of the diaphragm from which it flows through the matrix to a hot air space 14 within which the combustion apparatus is mounted. The turbine exhaust flows outwardly through the matrix into the housing and is discharged through a suitable exhaust port (not shown). The means for supporting the matrix and rotating it about its axis are not illustrated, it being understood that the matrix is rotated at a rather slow rate, such as 30 revolutions per minute. There is a pressure difference between the spaces 14 and 16 equal to the pressure drop across the turbines. Thus, there may be a 40 or 50 pound per square inch pressure drop tending to cause leakage where the matrix 7 passes through the diaphragm. The main seal which is provided to minimize such leakage comprises a primary seal 18, which is a rectangular frame disposed closely around the matrix, and a secondary seal 19, which is a frame of thin sheet metal bridging the gap between the primary seal 18 and the diaphragm.

The primary seal 18 comprises a seal bar 21 extending across the outer or cooler face of the matrix, a seal bar 22 extending across the inner or hot face of the matrix, and end plates 23 adjacent each rim of the matrix, these plates being rigidly fixed to the seal bar 21 by machine screws 25 and defining arms extending into proximity to the ends of seal bar 22. These members define a frame encircling the matrix 7, which comprises end rings or rims 26 and corrugated sheets 29 extending between the rims and defining passages for radial flow of gas. The matrix may also include rigid spacers extending between and fixed to the rims (not illustrated). Some of the elements of the matrix extend into close proximity to the seal bars 21 and 22 so that a labyrinth seal is provided, minimizing flow along the faces of the matrix from the high pressure to the low pressure side of the diaphragm. Details of the matrix are immaterial to this invention and therefore need not be described.

The end plates 23 are in two sections, a section 31 on the low pressure side of secondary seal 19 and a portion 33 on the high pressure side of seal 19. The cap screws 25 secure both of these portions to the outer seal bar 21. The portions 33 of the end plates mount rollers 34 which roll on the outer surface of the rims 26. The rollers are biased into engagement with the rims by compression springs 35 engaging an abutment in the housing 5. These rollers locate the primary seal radially of the matrix. It is located circumferentially of the matrix by a roller 37 mounted on each end plate portion 33 which extends into a slot 38 in the diaphragm or a cover plate 39 put on to enclose the primary and secondary seals. The slot 38, as can be seen in FIGURE 1, is directed radially of the matrix.

Figure 2:
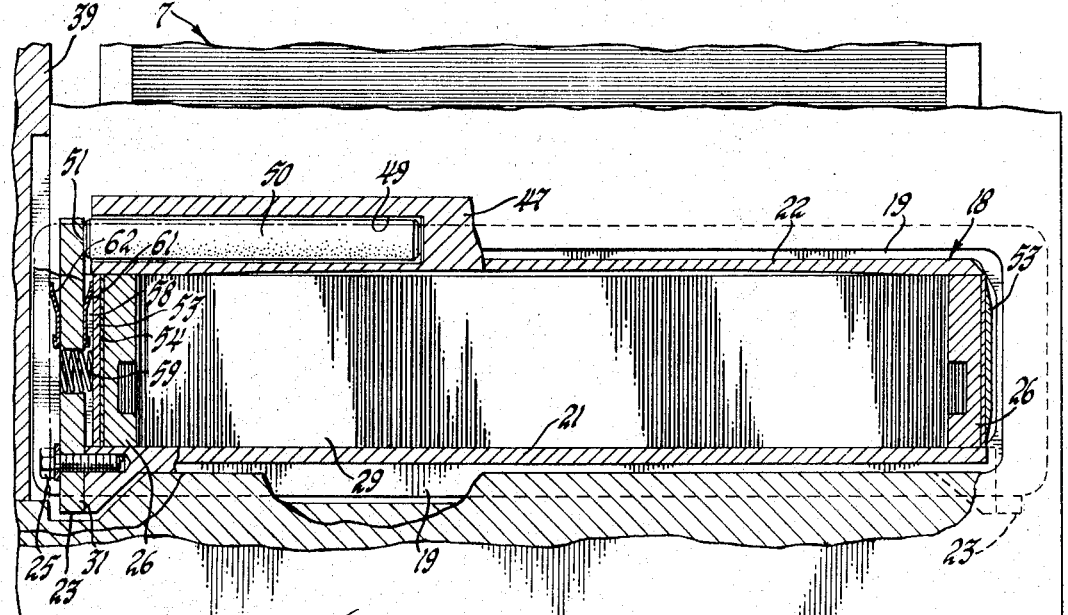
FIGURE 2 is a partial sectional view to a larger scale taken on the plane indicated by the line 2—2 in FIGURE 1.
Figure 3:
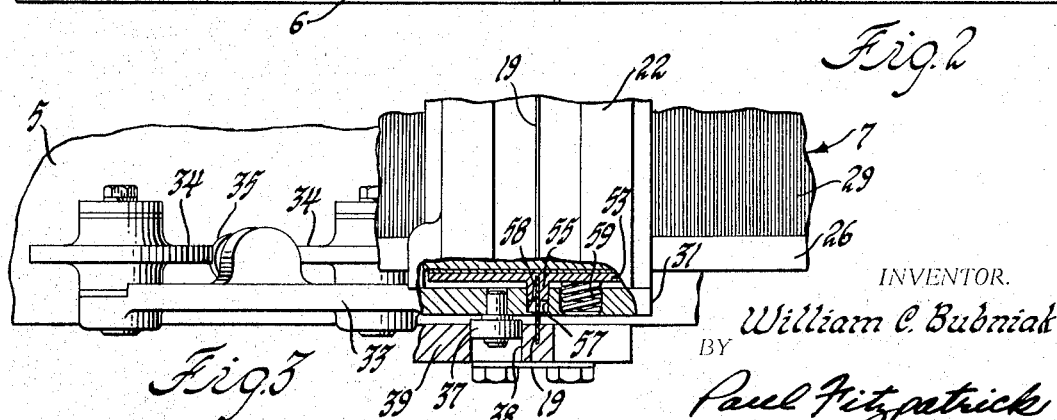
FIGURE 3 is a fragmentary view taken radially on the matrix on the plane indicated by the line 3—3 in FIGURE 1.

The inner seal bar 22 is located with respect to the end plates 23 and the outer seal bar by pins 41 and 42 extending from each end of the bar and received in notches in the end plates. Pin 41 bottoms against a notch in the lateral face of a projection 43 of the portion 33 and pin 42 has some freedom for travel circumferentially of the matrix in a slot 45 in the other portion of the end plate. Since the space 14 is at high pressure relative to space 16, there is no opportunity for the pins to come out of the notches. The secondary seal 19 also prevents detachment of the inner seal bar when the engine is not running. The inner surface of seal bar 22 has a complex curvature to conform to the surface of the matrix when it is hot and the outer seal bar 21 has a cylindrical surface conforming to the matrix when it is cold, as described in the aforementioned Patent No. 2,888,248. When the inner seal bar 22 heats, it bears against the end plate 23 and causes seal bar 21 to bow radially inwardly as in the patent. In this case, however, the structure of the inner or hot side seal bar 22 comprises a body 47 having a bore 49 parallel to the matrix axis within which is a rod 50 of any suitable low thermal expansion crystalline glass ceramic material available in commerce. One such material is sold by Corning Glass Works as "Cercor 9690." The right end of body 47 as depicted in FIGURE 2 bears against the right side end plate 23 and the rod 50, which projects slightly from the bore 49, bears at 51 against the portion 33 of the end plate 23. The over-all coefficient of expansion of the seal bar 22 may be varied by varying the material of the body or the material of the rod or by varying the relative length of the rod with respect to the over-all length of the seal bar. This flexibility in design makes it possible to select the most suitable material for the seal bar and adjust the expansion to suit the requirements.

As indicated, the seal structure particularly described is intended for use with a matrix having relatively low thermal distortion. In this case, the outer or cooler seal bar is made of an alloy having a relatively low coefficient of thermal expansion as, for example, a thirty-eight percent nickel iron which has about as low a coefficient as any metal. The material of the inner seal bar 22 may be selected primarily for its resistance to a relatively hot environment without concern for its thermal expansion, since this is controlled by the ceramic rod 50. The ceramic rod 50 is of much lower thermal expansion than even the nickel iron alloy of the outer seal bar 21. In the preferred embodiment, the inner seal bar is made of Ni-resist ductile iron and the ceramic rod 50 may be from approximately one-third to over one-half of the total length of the seal bar. Also, if desired, a bore 49 and rod 50 may be provided at each end of seal bar 22.

The rims 26 of the matrix are engaged by end blocks 53, which are preferably metal plates with a suitable anti-friction high temperature resistant facing 54 bearing against the face of the matrix rim. The end block also includes a flange 55 which is received in a slot defined by the faces 57 and 58 of the portions 31 and 33 of the end plate. The flange 55 is mounted sufficiently loosely that the end block can slide to or from the end plate as required by shifting or expansion of the matrix. The end block is biased into contact with the matrix by a compression spring 59 received in a socket in the portion 31.

The rectangular secondary seal 19 of thin sheet metal extends through a narrow gap between the portions 31 and 33 and into a saw cut extending longitudinally of flange 55. It also extends into saw cuts across the outer margins of the seal bars 21 and 22 and correspondingly into saw cuts in the structure of the bulkhead surrounding the main seal, including the bulkhead 6 and the cover plate 39. The pressure difference biases the shim stock against the low pressure side of the saw cuts. Radial or sideways movement of the primary seal is permitted by an excess of depth of the saw cuts. Since the secondary seal 19 extends into the end blocks 53, it serves to seal against gas bypassing circumferentially of the matrix past both the inside and outside surfaces of the end plates 23.

This relation of the secondary seal and the end blocks is the subject of my copending application Serial No. 476,426 for Rotary Regenerator Seal, filed August 2, 1965.

There is a relatively slight pressure difference radially of the matrix because of the slight resistance to flow of gas through the matrix. For this reason, each of the end plate portions 31 and 33 bears an internal seal 61 bearing against the end block 53 and an external seal 62 bearing against the structure of the bulkhead or cover plate 39. These seals are rectangular leaf spring spot-welded to the faces of the portions 31 and 33, as shown in FIGURES 1 and 2. They fit closely against the end block and against the adjacent structure of the bulkhead or cover plate to substantially prevent radial flow through or past the main seal bypassing the heat exchange material 29.

It will be clear to those skilled in the art from the foregoing description that the main seal according to the invention is an improvement over those of the prior art referred to, adapted to provide more complete sealing and thus improve the efficiency of an engine in which the regenerator is included.

Particularly, the invention makes it possible to control very closely the distortion of the primary seal and also to reduce the distortion to a very low value to agree with the characteristics of matrices embodying structures which minimize thermal distortion. It makes it possible to select the material for the hot side seal bar primarily for its desirable operating characteristics without having to compromise these to obtain the desired thermal expansion.

The detailed description of the preferred embodiment of the invention for the purpose of explaining the principles thereof is not to be considered as limiting or restricting the invention, since many modifications may be made by the exercise of skill in the art.

I claim:

1. A rotary regenerator comprising, in combination, an annular rotatable matrix substantially rectangular in cross section and bounded by two opposite faces and two edges, one face being hotter than the other face in operation of the regenerator, causing distortion of the matrix such that the colder face is distorted concavely and the hotter face is distorted convexly, and a primary seal extending around the matrix in close juxtaposition to the faces and edges thereof and adapted to inhibit fluid flow circumferentially of the matrix through the seal, the primary seal comprising a stiff elastic first seal bar extending across the colder face of the matrix, arms rigid on the bar extending across the edges of the matrix, and a rigid second seal bar extending across the hotter face of the matrix and connected to the arms, differential thermal expansion of the second bar relative to the first bar when the regenerator is in operation spreading the arms and bowing the first bar toward the matrix, the face of the second bar confronting the matrix having clearance from the matrix in the cold condition corresponding to the convex distortion of the hot face in operation characterized by a structure of the second seal bar embodying sections of diverse material of different coefficients of thermal expansion disposed end-to-end between the said arms so that the effective coefficient of thermal expansion of the second seal bar is determined by the coefficients of thermal expansion and relative lengths of the sections.

2. A rotary regenerator as recited in claim 1 in which the second seal bar includes a body which extends substantially from one of said arms to the other said arm and defines a socket therein extending lengthwise of the seal bar and a rod of a material different from the body mounted in said socket and bearing against one of said arms.

3. A rotary regenerator as recited in claim 2 in which the body is metallic and the rod is of a ceramic material.

4. A rotary regenerator as recited in claim 3 in which the first seal bar is of a metal having a low thermal coefficient of expansion and the rod is of a ceramic material.

5. A primary seal for a rotary regenerator matrix having faces cooperating with the seal, one face distorting away from the seal and the other face distorting toward the seal when the matrix is heated, the seal comprising, in combination,
- a stiff elastic first seal bar having a sealing face conforming to the said one face of the matrix when the bar and matrix are cold,
- a rigid second seal bar having a sealing face conforming to the said other face of the matrix when the bar and matrix are hot, and
- means responsive to differential thermal expansion of the seal bars for distorting the first seal bar to conform to the distorted condition of the said one face of the matrix when the matrix and bars are heated comprising arms rigid on the first seal bar and engaging the ends of the second seal bar
- characterized by a second seal bar embodying sections of diverse material of different coefficients of thermal expansion disposed end-to-end between the said arms so that the effective coefficient of thermal expansion of the second seal bar is determined by the coefficients of thermal expansion and relative lengths of the sections.

6. A primary seal as recited in claim 5 in which the second seal bar includes a body which extends substantially from one of said arms to the other said arms and defines a socket therein extending lengthwise of the seal bar and
- a rod of a material different from the body mounted in said socket and bearing against one of said arms.

7. A primary seal as recited in claim 6 in which the body is metallic and the rod is of a ceramic material.

8. A primary seal as recited in claim 7 in which the first seal bar is of a metal having a low thermal coefficient of expansion and the rod is of a ceramic material.

References Cited by the Examiner
UNITED STATES PATENTS

| | | | |
|---|---|---|---|
| 2,888,248 | 5/1959 | Bubniak et al. | 165—9 |
| 3,057,604 | 10/1962 | Bubniak et al. | 165—9 |
| 3,095,036 | 6/1963 | Teufel | 165—9 |
| 3,180,402 | 4/1965 | Moffat | 165—9 |

ROBERT A. O'LEARY, *Primary Examiner.*

A. W. DAVIS, *Assistant Examiner.*